United States Patent [19]

Lu et al.

[11] Patent Number: 5,624,973
[45] Date of Patent: Apr. 29, 1997

[54] POLYMERS HAVING SUBSTANTIALLY NONPOROUS BICONTINUOUS STRUCTURES PREPARED BY THE PHOTOPOLYMERIZATION OF MICROEMULSIONS

[75] Inventors: Ying-Yuh Lu, Woodbury; Chung I. Young, Roseville, both of Minn.

[73] Assignee: Minnesota Mining and Manufacturing Company, Saint Paul, Minn.

[21] Appl. No.: 453,960

[22] Filed: May 30, 1995

Related U.S. Application Data

[62] Division of Ser. No. 189,060, Jan. 28, 1994, abandoned.
[51] Int. Cl.$^6$ .......................... C08J 3/28; C08K 5/04
[52] U.S. Cl. .................... 522/40; 522/46; 522/53; 522/84
[58] Field of Search ...................... 522/84, 85, 40, 522/46, 53, 74, 75, 78, 79, 81, 82

[56] References Cited

U.S. PATENT DOCUMENTS

| | | | |
|---|---|---|---|
| 3,996,180 | 12/1976 | Kane | 260/29.6 H |
| 4,181,752 | 1/1980 | Martens et al. | 427/54.1 |
| 4,289,844 | 9/1981 | Specht et al. | 430/281 |
| 4,303,485 | 12/1981 | Levens | 204/159.24 |
| 4,338,232 | 7/1982 | Harris et al. | 523/414 |
| 4,442,258 | 4/1984 | Sunakawa et al. | 524/767 |
| 4,485,209 | 11/1984 | Fan et al. | 524/801 |
| 4,504,618 | 3/1985 | Irvine et al. | 524/457 |
| 4,521,317 | 6/1985 | Candau et al. | 252/8.55 D |
| 4,521,580 | 6/1985 | Turner et al. | 526/307.2 |
| 4,564,664 | 1/1986 | Chang et al. | 524/833 |
| 4,576,975 | 3/1986 | Reilly, Jr. | 522/13 |
| 4,681,912 | 7/1987 | Durand et al. | 524/827 |
| 4,739,008 | 4/1988 | Robinson et al. | 524/801 |
| 4,742,086 | 5/1988 | Masamizu et al. | 521/62 |
| 4,745,156 | 5/1988 | Ruffner | 524/801 |
| 4,851,216 | 7/1989 | Lee | 424/78 |
| 4,939,190 | 7/1990 | Tomioka et al. | 523/206 |
| 5,049,275 | 9/1991 | Gillberg-LaForce et al. | 210/500.27 |
| 5,151,217 | 9/1992 | Price | 252/312 |
| 5,238,992 | 8/1993 | Outubuddin | 524/710 |

FOREIGN PATENT DOCUMENTS

| | | |
|---|---|---|
| 0391343A2 | 10/1990 | European Pat. Off. . |
| 0430517A2 | 6/1991 | European Pat. Off. . |
| 0531005A2 | 3/1993 | European Pat. Off. . |
| 2197791 | 6/1986 | United Kingdom . |
| WO93/09713 | 5/1993 | WIPO . |

OTHER PUBLICATIONS

Candau et al., *Progr Colloid & Polymer Sci.*, 73:33–36 (1987).
Cheung et al., *Langmuir*, 1991, vol. 7, pp. 1378ff. and 2586ff.
Chew and Gan, *J. Polym. Sci.: Polym. Chem.*, 1985, 23, pp. 2225–2282.
*Encyclopedia of Polymer Science Engineering*; Wiley: New York 1987, vol. 9, p. 718.
Hague et al., Journal of Polymer Science: Part C: Polymer Letters, vol. 26, 429–432 (1988).
Kuo, et al., *Macromolecules*, 1987, 20, p. 1216.
Outubuddin et al., "Preparation and Characterization of Porous Polymers from Microemulsions", Chapter 5 of ACS Symposium Series 384, Polymer Association Structures, American Chemical Society, 1989.

(List continued on next page.)

*Primary Examiner*—Susan W. Berman
*Attorney, Agent, or Firm*—Gary L. Griswold; Walter N. Kirn; John H. Hornickel

[57] ABSTRACT

A polymer composite is described having a bicontinuous structure of two substantially nonporous phases, one being a hydrophilic polymer and the other being a hydrophobic polymer. The bulk properties of both polymers are retained in the polymer composite. The composite is prepared from a microemulsion comprising a free-radically ethylenically unsaturated polar species in the aqueous phase, a free-radically ethylenically unsaturated hydrophobic monomer in the oil phase, and surfactant.

29 Claims, 4 Drawing Sheets

OTHER PUBLICATIONS

Puig et al., *J. Colloid Interface Sci.*, vol. 137, pp. 308–310 (1990).

Puig et al., *ANTEC '91*, pp. 1145–1147.

Raj et al., *Langmuir*, 1991, vol. 7, pp. 1378ff. and 2586ff.

Sasthav et al., *Langmujir*, 7, 1378–1382 (1991).

Stoffer and Bone, *J. Dispersion Sci. Technol.*, 1, pp. 37–54 (1980).

Vašková et al., *Makromol. Chem*, 192, 989–997 (1991).

Vašková et al., *Makromol. Chem*, 192, 1339–1347 (1991).

POLYMERS HAVING SUBSTANTIALLY NONPOROUS BICONTINUOUS STRUCTURES PREPARED BY THE PHOTOPOLYMERIZATION OF MICROEMULSIONS

This is a division of application Ser. No. 08/189,060 filed Jan. 28, 1994, now abandoned.

FIELD OF THE INVENTION

This invention relates to a polymeric material having a substantially nonporous bicontinuous structure, that is, a substantially nonporous structure in which both hydrophilic and hydrophobic polymer phases are continuous and each exhibits its respective bulk properties. The invention also relates to microemulsions in which free-radically polymerizable monomers are present in both the aqueous and the oil phases, a method of preparing the microemulsions, and a method of preparing polymeric material therefrom.

BACKGROUND OF THE INVENTION

Microemulsions are water-oil colloidal dispersions stabilized by an appropriate mixture of surface-active agents (usually a surfactant such as a soap and a cosurfactant such as a short chain alcohol). By contrast with conventional milky emulsions, for which the stability is of purely kinetic origin, microemulsions are thermodynamically stable and form spontaneously at contact. The small size of the spherical droplets (about 10 nm) dispersed in the continuous medium explains their optical transparency (*Encyclopedia of Polymer Science Engineering*; Wiley: New York 1987, Vol. 9, p. 718, incorporated by reference herein).

Microemulsions differ from macroemulsions and miniemulsions. Macroemulsions, conventionally known as emulsions, are thermodynamically unstable mixtures of two immiscible liquids, one of which is dispersed in the form of fine droplets having diameters greater than 100 nm in the other liquid. Macroemulsions are turbid, usually milky white in color. Miniemulsions are opaque, thermodynamically unstable emulsions containing two immiscible fluids which are prepared using a mixture of ionic surfactant and a cosurfactant such as a long chain fatty-alcohol or n-alkane. Relatively high mechanical shear is required to produce miniemulsions with an average droplet size of 100 to 500 nm.

Microemulsions can be oil-in-water (water-continuous) types, water-in-oil (oil-continuous) types and bicontinuous types. In bicontinuous microemulsions both the oil and water phases coexist in interconnected continuous domains with surfactant molecules located at the interface. The water, oil, and cosurfactant (usually a short chain alcohol) in bicontinuous microemulsion systems diffuse at rates that are comparable to those of the neat components.

In principle, free-radical polymerization of a vinyl monomer can be achieved in either the continuous phase or the dispersed phase of oil-in-water (o/w), water-in-oil (w/o), or bicontinuous microemulsions. Kuo, et al. (*Macromolecules*, 1987, 20, p. 1216) describe polymerization of styrene in the dispersed phase of an o/w microemulsion, while Candau et al. (U.S. Pat. No. 4,681,912) have disclosed polymerization of water-soluble monomers in the dispersed phase of w/o microemulsions. Chew and Gan (*J. Polym. Sci.: Polym. Chem.*, 1985, 23, p. 2225) attempted to polymerize methyl methacrylate as the continuous phase of a w/o emulsion with water dispersed in the polymer matrix. However, no evidence of a bicontinuous structure of the resultant polymer was observed. Stoffer and Bone (*J. Dispersion Sci. Technol.*, 1980, 1, p. 37) also report the polymerization of methyl methacrylate as the continuous phase in a system which also contained sodium dodecylsulfonate, pentanol and water.

Shah et al., (European Patent Application 391,343) disclose polymerization of, e.g., acrylate monomers, as the dispersed phase of aqueous microemulsions, to produce extremely small polymeric particles.

Puig et al. (*J. Colloid Interface Sci.*, 1990, Vol. 137, p. 308) discuss polymerization of acrylic acid/styrene microemulsions wherein one of the monomers (acrylic acid) is significantly soluble in the water phase. The resultant copolymer consists of isolated acrylic acid units randomly distributed among polystyrene blocks.

The above references teach only thermal methods of initiating polymerization. None of the references discloses the preparation of a polymer having a bicontinuous structure wherein both phases are solids, or a bicontinuous polymer in which hydrophobic and hydrophilic polymers coexist in both phases and which arises from polymerization of a microemulsion.

Price (U.S. Pat. No. 5,151,217) has disclosed the preparation of bicontinuous microemulsions of hydrophobic monomers such as styrene, alkyl esters of (meth)acrylates, plus a crosslinking agent, in the presence of a unique addition-polymerizable cationic surfactant. The objective of Price was to prepare, via photopolymerization, solid polymers which could be used in separation processes. The preparation or polymerization of a microemulsion in which free-radically polymerizable monomers are present in both the water and oil phases is not disclosed, nor is the use of a polar monomer in either phase disclosed. Finally, the product polymers exhibit a solid phase and a liquid phase rather than two solid phases.

Photopolymerization of bicontinuous microemulsions has been reported by Cheung et al. (*Langmuir*, 1991, Vol. 7, pp. 1378 ff. and 2586 ff.). Styrene/water microemulsions produced porous polystyrene membranes. Polymerizations of methyl methacrylate/acrylic acid microemulsions both in the presence and absence of added surfactant produced porous polymeric solids reported to have good mechanical stability. Although a polar monomer is reportedly employed in these systems, microscopic examination showed that the resulting copolymeric materials were single-phased porous systems.

European Patent Publication 0 432 517, assigned to the assignee of the present invention and incorporated by reference herein, describes photopolymerization of the hydrophobic phase of bicontinuous microemulsions which also contain biologically active materials, to form a porous membrane, film, or bead. Polymerization of monomers in the hydrophilic phase is not disclosed or claimed.

U.S. Pat. No. 5,238,992 (Outubuddin) discloses microemulsion polymer blends and composites having controlled porosity prepared from microemulsions containing both hydrophilic and hydrophobic phases. The microemulsions are prepared with surfactant systems, optional co-solvents, and hydrophilic monomer(s) in the hydrophilic phase and hydrophobic monomer(s) in the hydrophobic phase. The resulting blend shows pores in both micron and submicron regions, and normally displays greater porosity when the microemulsion is of the bicontinuous type in contrast to either oil-in-water type or the water-in-oil type.

SUMMARY OF THE INVENTION

The art has not recognized the ability to produce nor the need for polymers with a substantially nonporous, bicontinuous structure. These polymers with substantially nonporous bicontinuous structure are derived from concurrent polymerization of a free-radically polymerizable hydrophilic polar species in the aqueous (water) phase of a microemulsion and a concurrent polymerization of a free-radically polymerizable hydrophobic monomer in the organic (oil) phase to form a polymer having two solid, substantially nonporous bicontinuous phases.

Such polymers with a substantially nonporous, bicontinuous structure would find utility especially in applications where the bulk properties of both hydrophilic and hydrophobic polymers are required simultaneously. For instance, a breathable film with high water vapor transport properties which is also impermeable to water and/or bacteria is highly desirable. Also, the entrapment, and slow release, of either hydrophobic or hydrophilic materials in such a polymer is possible. In addition, materials could be produced which take advantage of other bulk properties of either phase or both phases simultaneously to create, e.g., a tacky acrylate-type adhesive which is electrically conductive due to electrolyte included in the hydrophilic phase.

The present invention provides a solid, substantially nonporous bicontinuous polymeric material and a method of preparing the material, a microemulsion comprising both a hydrophilic free-radically polymerizable polar species and a hydrophobic free-radically polymerizable monomer, and a method of forming the microemulsion.

The polymer composite of the invention, which has a substantially nonporous, bicontinuous structure, comprises:

the polymerization product of a microemulsion having an aqueous phase and an oil phase, the microemulsion comprising:
(a) about 2 to about 40 weight percent water;
(b) about 2 to about 60 weight percent free-radically copolymerizable ethylenically-unsaturated polar species;
(c) about 15 to about 85 weight percent hydrophobic free-radically copolymerizable ethylenically-unsaturated monomer;
(d) about 5 to about 70 weight percent of a surfactant selected from the group consisting of (i) nonionic surfactants, cationic surfactants, anionic surfactants, and mixtures thereof, wherein said surfactants are not copolymerizable with the polar species of element (b) and the monomer of element (c), (ii) ethylenically-unsaturated nonionic surfactants, cationic surfactants, anionic surfactants, and mixtures thereof which are copolymerizable with the species of element (b) and monomer of element (c), (iii) both (i) and (ii);
wherein said percentages of (a), (b), (c), and (d) are each based upon the total weight of the microemulsion; and
(e) about 0.01 to about 5 parts by weight of a lipophilic photoinitiator, wherein the amount of the photoinitiator is based on the total weight of elements (a) plus (b) plus (c) plus (d); and
wherein the polymerization product has a bicontinuous structure of biphases that are both substantially nonporous solids.

The unique bicontinuous polymeric systems of this invention are the result of concurrent polymerization of free-radically polymerizable species in both the aqueous phase and organic phase of a microemulsion. At the time of concurrent polymerization in each phase, the aqueous phase and the organic phase coexist in interconnected continuous domains; they are bicontinuous.

Thus, polymerization in the aqueous phase results in a hydrophilic polymer having hydrophilic bulk properties, while polymerization in the oil phase results in a hydrophobic polymer having hydrophobic bulk properties. Because the concurrent polymerization occurs, a substantially nonporous polymer composite having both a hydrophilic polymer and a hydrophobic polymer results. Substantially neither polymer is in a dispersed phase; both polymers coexist in substantially interconnected domains, such that the resulting composite is substantially nonporous and bicontinuous. The polymer composite has two solid phases, one of hydrophilic polymer and the other of hydrophobic polymer existing in a substantially nonporous, bicontinuous structure.

While not being limited to a particular theory, polymer composites of the present invention have both a hydrophobic continuous phase and a hydrophilic continuous phase because of the formation of the morphology during the polymerization of the microemulsion. The hydrophobic continuous phase is formed as hydrophobic monomers polymerize; the hydrophilic continuous phase is formed as hydrophilic monomers polymerize. The resulting polymerized microemulsion composition has both continuous hydrophobic and continuous hydrophilic properties, such that solvents of neither the hydrophobic polymer nor solvents of the hydrophilic polymer can dissolve the resulting polymerized microemulsion composition.

It is presently not known whether there are independent hydrophobic and hydrophilic polymers so intertwined at the time of polymerization so as to form a mechanical integrity that can resist solvation or whether there is some copolymerization of hydrophobic monomers and hydrophilic monomers so as to form a chemically covalent integrity at some regions where hydrophobic monomers and hydrophilic monomers have copolymerized.

But the morphology of the polymer composites is different than a two-phase composite where one phase is dispersed and the other phase is continuous, even if the exact morphology can not be described on a molecular level, because the composition of the present invention exhibits bulk properties that are consistent with continuity of both a hydrophobic polymeric phase and with continuity of a hydrophilic polymeric phase.

"Bicontinuous structure" has been chosen to describe the morphology of the polymerized microemulsion that exhibits properties consistent with both a hydrophobic continuous phase and a hydrophilic continuous phase.

The method of polymerization is also important to the morphology of the resulting polymer composite. Rapid polymerization of both types of monomers is needed in order for the mixture to remain as a stable microemulsion during polymerization and for the resulting polymer composite to exhibit the structural integrity. Free radical polymerization using photoinitiators and electromagnetic radiation is a method to achieve rapid and controllable polymerization that allows the morphology of the microemulsion to "freeze" or remain stable and minimize phase separation of the microemulsion during polymerization resulting in a substantially nonporous polymer composite. While, by comparison, under some conditions, it is possible to form a substantially nonporous polymer composite under thermally initiated free radical polymerization conditions using monomers exemplified in U.S. Pat. No. 5,238,992 (Outubuddin), the ability to control a thermally initiated reaction is limited. A thermally induced polymerization can alter the morphology of the resulting polymer composite due to difficulty in controlling the polymerization reaction kinetics. The present invention uses photopolymerization because the morphology of the microemulsion during polymerization (and hence for the resulting polymerized microemulsion) is easier to control via photoinitiation as compared with thermal initiation, in order to achieve the desired morphology of the polymer composite of the present invention.

Unexpectedly, use of a photoinitiated polymerization assures the formation of the desired substantially nonporous composite of the present invention. The photopolymerization method is quite reliable because it does not require an alteration of temperature to initiate polymerization, because polymerization is controllable (e.g., polymerization occurs only so long as electromagnetic radiation is delivered), and because photopolymerization minimizes phase separation of the microemulsion during photopolymerization.

Moreover, U.S. Pat. No. 5,238,992 discloses a preference for formation of porous polymer blends and composites using thermally initiated polymerization.

The present invention avoids porous blends and composites by providing a polymer composite with a substantially nonporous bicontinuous structure prepared by photopolymerization, not thermally initiated polymerization.

As used herein, the term "substantially nonporous" means that pores or open spaces in the composite do not exist on a level greater than 0.1 μm diameter. "Substantially nonporous" is specifically distinguished from a porous structure on a micrometer level as disclosed in U.S. Pat. No. 5,238,992 and Qutubuddin et al., "Preparation and Characterization of Porous Polymers from Microemulsions" in Chapter 5 of ACS Symposium Series 384, Polymer Association Structures, American Chemical Society, 1989.

The aqueous phase comprises water and at least one free-radically copolymerizable ethylenically-unsaturated polar species such as monomers and/or oligomers. The aqueous phase can optionally further comprise one or more of the components selected from the group consisting of a non-reactive polar oligomeric additive; a free-radically polymerizable, photochemically-activated crosslinker; a cosolvent; a water-soluble free-radical photopolymerization initiator; a water-soluble free-radical thermal initiator, a water-soluble functional additive such as those selected from the group consisting of electrolytes, dyes, and pharmaceutically-active materials.

As used herein, the term "polar" refers to species which exhibit a measurable dipole moment and the term "oligomer" refers to polymeric species having at least two and up to about 2000 repeating units.

The organic phase comprises at least one free-radically polymerizable ethylenically-unsaturated hydrophobic monomer, a free-radically polymerizable ethylenically-unsaturated polar monomer, and an oil-soluble free-radical photopolymerization initiator. The organic phase can optionally further comprise one or more of the components selected from the group consisting of a non-reactive polar oligomeric additive; an oil soluble crosslinking agent which can contribute to the bulk properties of the resulting composition; an oil soluble chain-transfer agent; an oil-soluble free-radical thermal initiator; oil-soluble functional additives such as those selected from the group consisting of plasticizing agents, dyes, pharmaceutically-active materials, and tackifiers.

The third principal constituent of the microemulsion is a compatible surfactant, which can be nonionic or ionic (i.e., anionic or cationic), preferably, anionic or nonionic. Where appropriate, additives and fillers (such as a web, a scrim or silica, activated carbon black, or fibrous fillers), which are soluble in neither the aqueous phase nor the organic phase but which may be disposed within the final polymer composite having a substantially nonporous, bicontinuous structure may be included.

Transparent microemulsions form spontaneously on admixture of the components which make up the aqueous phase, the organic phase, and the surfactant in any order. The microemulsion is then cast into an appropriate mold and irradiated with electromagnetic radiation to effect rapid free-radical polymerization or it is coated onto a substrate and irradiated with electromagnetic radiation to effect rapid free-radical polymerization on the substrate, or it can be cast so as to encompass a sheet or mesh of reinforcing material, such as a scrim, etc., then irradiated with electromagnetic radiation to effect rapid free-radical polymerization. In each alternative, "rapid" means that polymerization occurs in a manner that does not substantially alter the morphology of the microemulsion during polymerization, such that a substantially nonporous, bicontinuous structure in the polymer composite results.

Preferably, electromagnetic radiation is ultraviolet light that activates photoinitiators in the microemulsion to permit concurrent polymerization of the monomers and/or oligomers in the microemulsion.

The resulting polymeric composites having a substantially nonporous, bicontinuous structure can be tacky or nontacky, as a function of the hydrophobic monomers used, and the overall properties of the system can be tailored according to components in both the aqueous and organic phases.

The substantially nonporous bicontinous structure of the polymer composite of the present invention can be examined by scanning electron microscopy. On a micron and submicron level, it can be seen, for example in the scanning electron photomicrograph of FIG. 4 that there are no pores or open spaces in the polymer composite of the present invention.

A feature of the present invention is that the bulk properties of the hydrophilic polymer (polymerized in the aqueous phase of the microemulsion) coexist with the bulk properties of the hydrophobic polymer (polymerized in the oil phase of the microemulsion).

Another feature of the present invention is that the polymer composite of the present invention can bring the bulk properties of the hydrophilic polymer as an improvement to a conventional hydrophobic polymer and vice versa.

An advantage of the present invention is that neither phase of the polymer composite is a dispersed phase, isolated from continuity in the composite.

Another advantage of the present invention is that rapid photoinitiated polymerization results in substantially nonporous polymer composites.

BRIEF DESCRIPTION OF THE DRAWINGS

Each combination of phases of a microemulsion requires a specific formulation. The phase diagrams of FIGS. 1–3 indicate useful ranges of concentration for major components of the microemulsions in accordance with this invention.

DETAILED DESCRIPTION OF THE INVENTION

I. Aqueous Phase

Figure 1:
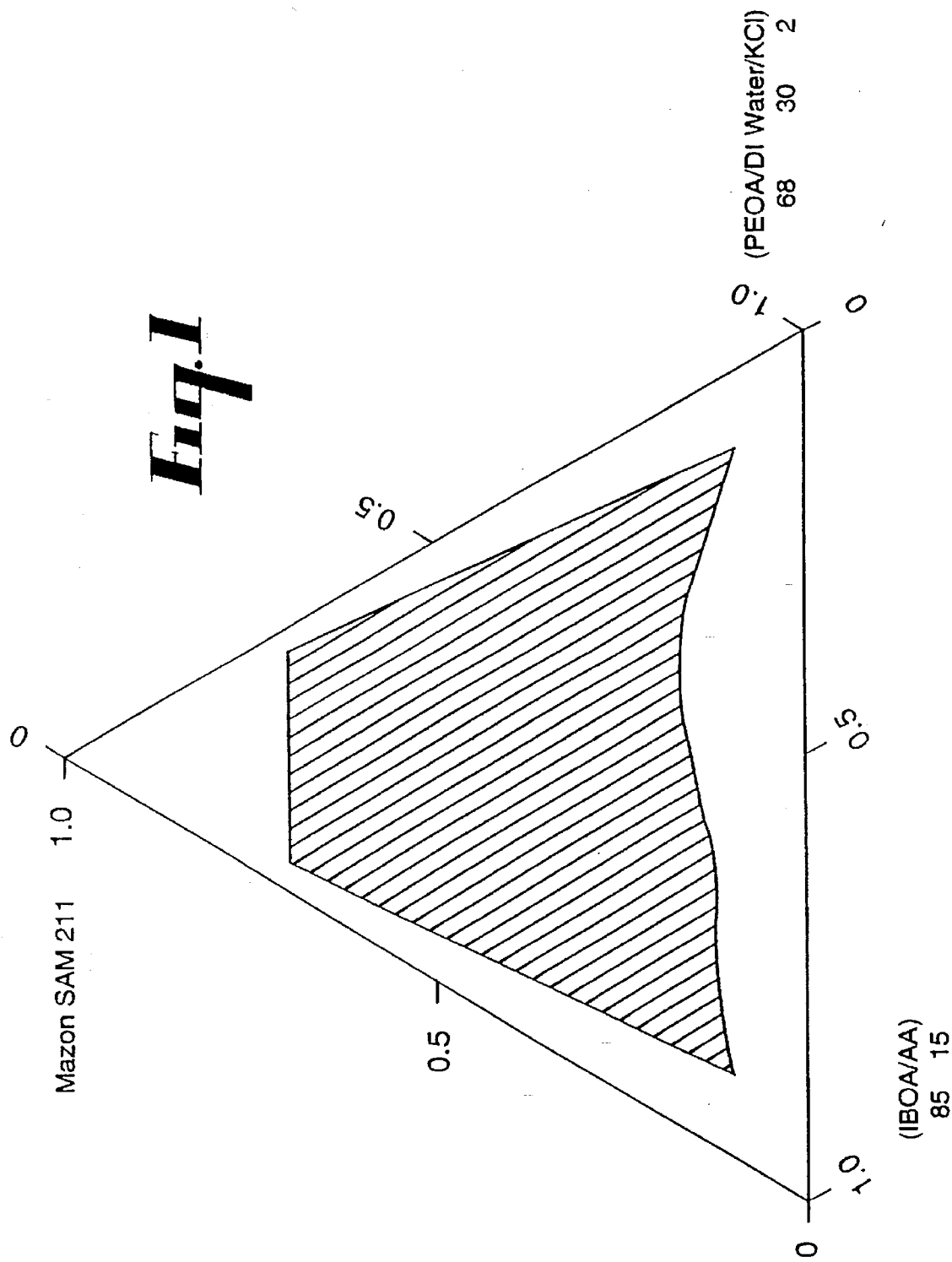
FIG. 1 is a phase diagram, showing both a clear microemulsion area and a turbid emulsion area for preferred compositions of the present invention in which the surfactant is a copolymerizable anionic surfactant.

Prior to polymerization commencing, the aqueous phase of the microemulsion comprises water, free radically (co) polymerizable ethylenically unsaturated polar species, optional water soluble initiator, and optional water soluble additive.

I.a. Water

The microemulsion of the present invention comprises from about 2 to about 40 percent by weight of water, preferably about 5 to about 30 percent by weight, and, most preferably about 6 to about 20 percent by weight, based upon the total weight of the microemulsion. Preferably the microemulsion comprises deionized water.

I.b. Free-Radically (Co)Polymerizable Ethylenically-Unsaturated Polar Species

The aqueous phase of the present invention comprises, in addition to water, free-radically polymerizable ethylenically-unsaturated polar specie(s). Such polar specie (s) are selected from the group consisting of monomers which are substantially insoluble in the oil phase, polar monomers other than oil-insoluble monomers (i.e. monomers which are both water soluble and oil soluble), and polar oligomers (i.e. hydrophilic oligomers which are substantially insoluble in the oil phase or oligomers which are both water soluble and oil soluble).

Such monomers are selected from the group consisting of polar monomers which are substantially insoluble in the oil phase and polar monomers other than oil-insoluble monomers (i.e. polar monomers which are both water soluble and oil soluble).

The microemulsion cumulatively comprises from about 2 to about 60 percent by weight of the required polar species preferably from about 5 to about 50 percent by weight, and most preferably from about 8 to about 40 weight percent, based upon the total weight of the microemulsion, depending upon the desired properties of the polymer composite.

I.b.i. Polar Ethylenically-Unsaturated Free-Radically (Co)Polymerizable Oligomers Useful polar ethylenically-unsaturated free-radically (co) polymerizable oligomers which are substantially insoluble in the oil phase or which are both water soluble and oil soluble include but are not limited to those selected from the group consisting of polyethylene oxide acrylates, polyethylene oxide diacrylates, polyethylene glycol acrylates, polyethylene glycol diacrylates, polyurethane acrylates, polyurethane diacrylates, N-vinylpyrrolidone macromer, and mixtures thereof. The polyethylene oxide acrylates and diacrylates are preferred. The most preferred oligomer comprises polyethylene oxide acrylate because of availability and ease of formulation. Useful oligomers typically have a number average molecular weight of about 100 to about 100,000, preferably about 100 to about 60,000, and most preferably about 100 to about 5000 for optimal physical properties (e.g., water absorption, nonporosity, strength) of the polymer composite having a substantially nonporous, bicontinuous structure.

I.b.ii. Substantially Oil-Insoluble Free-Radically (Co) Polymerizable Ethylenically-Unsaturated Polar Monomers A first type of polar monomer is a water-soluble free-radically (co)polymerizable ethylenically-unsaturated polar monomer that is substantially insoluble in the oil phase. "Substantially oil-insoluble" and "water-soluble" both mean that the monomer has a solubility of less than about 0.5% by weight in the oil phase and exhibits a distribution ratio at a given temperature (preferably about 25° to 35° C.) of concentration in the oil phase to concentration in the aqueous phase of less than about 0.005. Such monomer may be nonionic, e.g., acrylamide, or may be ionic. Mixtures of nonionic and ionic monomers may be used. Ionic monomers conforming to these criteria include but are not limited to those selected from the group consisting of sodium styrene sulfonate, potassium acrylate, sodium acrylate, sodium methacrylate, ammonium acrylate, sodium 2-acrylamido-2-methylpropane sulfonate, 4,4,9-trimethyl-4-azonia-7-oxa-dec-9-ene-1-sulfonate, N,N-dimethyl-N-(beta-methacryloxyethyl)ammonium propionate betaine, trimethylamine methacrylamide, 1,1-dimethyl-1-(2,3-dihydroxypropyl)amine methacrylamide, and other zwitterionic ethylenically-unsaturated monomers having the requisite solubility requirements, mixtures thereof, and the like. Preferred oil-insoluble polar monomers include those selected from the group consisting of acrylamide, sodium styrene sulfonate, sodium acrylate, sodium 2-acrylamido-2-methylpropane sulfonate, sodium methacrylate, and mixtures thereof, due to ease of formulation and desirable properties when polymerized.

I.b.iii. Free-Radically (Co)Polymerizable Ethylenically-Unsaturated Polar Monomers Other Than I.b.ii.

Many polar monomers known in the art exhibit some solubility in both water and oil. They can have a solubility of about 0.5% or greater in the oil phase and exhibit a distribution ratio at a given temperature (preferably about 25° C. to 30° C.) of concentration in the oil phase to a concentration in the aqueous phase of greater than or equal to about 0.005. Useful polar ethylenically-unsaturated free-radically (co)polymerizable monomers partitionable between the aqueous phase and the oil phase of the microemulsion of this invention include but are not limited to those selected from the group consisting of N-vinylpyrrolidone, N-vinylcaprolactam, (meth)acrylic acid, hydroxyethyl (meth)acrylate, itaconic acid, styrene sulfonic acid, N-substituted acrylamides, N,N-disubstituted acrylamides, N,N-dimethylaminoethyl methacrylate, 2-acrylamido-2-methyl propane sulfonic acid, and mixtures thereof. Preferred polar partitionable monomers include those selected from the group consisting of (meth)acrylic acid, N-vinylpyrrolidone, N-vinylcaprolactam, N,N-dimethylaminoethyl methacrylate, N,N-dimethylacrylamide, styrene sulfonic acid, 2-acrylamido-2-methyl propane sulfonic acid, and mixtures thereof. Most-preferred polar partitionable monomers include those selected from the group consisting of acrylic acid, N-vinylpyrrolidone, N-vinylcaprolactam, N,N-dimethylacrylamide, and mixtures thereof, because of the favorable properties, such as physical strength, they can impart to the polymer composite.

I.c. Water-Soluble Initiators

The aqueous phase may optionally further comprise a water-soluble free-radical polymerization initiator selected from the group consisting of photoinitiators, and mixtures of photoinitiators and thermal initiators.

I.c.i. Water-Soluble Photoinitators

Water-soluble photoinitiators useful in the present invention are photoinitiators which generate free radicals on exposure to electromagnetic (usually ultraviolet) radiation which act as initiators for the (co)polymerization of the hydrophilic monomer(s), the oleophilic monomer(s), the (co)polymerizable oligomers, and, when present, the (co) polymerizable surfactant as detailed below. Useful water-soluble photoinitiators include but are not limited to those selected from the group consisting of benzophenones substituted with an ionic moiety, a hydrophilic moiety or both; thioxanthones substituted with an ionic moiety, a hydrophilic moiety or both, and 4-substituted-(2-hydroxy-2-propyl)phenyl ketones, wherein the 4-substituent is an ionic or hydrophilic moiety. Such ionic or hydrophilic moieties include but are not limited to those moieties selected from the group consisting of hydroxyl groups, carboxyl groups, and carboxylic acid salt groups. Useful water-soluble benzophenones include but are not limited to those selected from the group consisting of 4-trimethylaminomethyl benzophenone hydrochloride and benzophenone sodium 4-methanesulfonate. Useful water-soluble thioxanthones include but are not limited to those selected from the group consisting of 3-(2-hydroxy-3-trimethylaminopropoxy) thioxanthone hydrochloride, 3-(3-trimethylaminopropoxy) thioxanthone hydrochloride, thioxanthone 3-(2-ethoxysulfonic acid) sodium salt, and thioxanthone 3-(3-propoxysulfonic acid) sodium salt. Useful water-soluble phenyl ketones include but are not limited to those selected from the group consisting of (2-hydroxy-2-propyl) (4-diethylene glycol phenyl) ketone, (2-hydroxy-2-propyl) (phenyl-4-butanecarboxylate) ketone, and their water-soluble salts. The preferred water-soluble photoinitiator is 4-trimethylaminomethyl benzophenone hydrochloride.

The aqueous phase may comprise about 0.05 to about 1 part by weight of a photoinitiator, when used, and preferably about 0.1 to about 1 part by weight based on 100 parts by weight of total (co)polymerizable species in the microemulsion.

I.c.ii. Optional Water-Soluble Thermal Initiators

Water-soluble thermal initiators useful in the present invention are initiators which, on exposure to heat, generate free-radicals which initiate (co)polymerization of the hydrophilic monomer(s), the oleophilic monomer(s), the (co) polymerizable oligomer and, when present, the (co) polymerizable surfactant, as detailed below. These thermal initiators are only used as a supplement to photoinitiators, in the event there is concern for complete polymerization of the monomers. Suitable water-soluble thermal initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble thermal initiator is ammonium persulfate. Preferably, most water-soluble thermal initiators are used at temperatures of from about 50° to about 70° C., while the oxidation-reduction-type initiators are used at temperatures of from about 30° to about 50° C. When used, water-soluble thermal initiators may comprise from about 0.05 to about 1 part by weight, preferably about 0.1 to about 1 part by weight based on 100 parts by weight of (co)polymerizable species in the microemulsion.

I.d. Water-Soluble Additives

The aqueous phase may optionally further comprise various water-soluble additive(s) in order to produce a polymer composite having specific properties and/or appearance. Each additive is selected to produce a desired end-product. For example, if a conductive polymer is desired, an electrolyte can be added. If a pigmented polymer is desired, a dye can be added. Examples of useful additives include but are not limited to those selected from the group consisting of water-soluble crosslinkers (such as methylene bisacrylamide), pH adjusters, electrolytes, dyes, pigments, pharmaceutically-active compounds, physiologically-active compounds, cosolvents, noncopolymerizable polar oligomers, mixtures thereof, and the like. In particular, electrolytes including but not limited to those selected from the group consisting of potassium chloride, lithium chloride, sodium chloride, and mixtures thereof have been found to be useful in various formulations of the present invention when it is desired that the polymer composite exhibit electrical conductivity. Up to about 5 parts by weight of an electrolyte can be included, preferably about 0.5 parts by weight to about 3 parts by weight based on 100 parts by weight of the total aqueous phase.

Noncopolymerizable polar oligomers useful as additives include but are not limited to those selected from the group consisting of poly(N-vinylpyrrolidone), polyethylene glycols, poly(oxyethylene) alcohols, poly(ethylenimine), and mixtures thereof. Such oligomers are added to affect the bulk properties of the resulting polymer composite, e.g., to impart hydrophilic properties to the material.

Typical cosolvents include but are not limited to those selected from the group consisting of aliphatic alcohols having from about 1 to about 8 carbon atoms (such as glycerin), polyethers (such as Butyl Cellosolve™, Butyl Carbitol™, Hexyl Cellosolve™, and Hexyl Carbitol™ all commercially available from Union Carbide), and mixtures thereof.

It will be readily recognized that essentially all organic water soluble additives which are added to the aqueous phase will exhibit a degree of solubility in the organic phase of the microemulsion. Each additive has its own distribution ratio between the aqueous phase and the organic phase. Thus, unless otherwise specified, the above-mentioned constituents of the aqueous phase will be found in and will affect the properties of the organic phase also. It is not necessary to the understanding and practice of the present invention to quantify the particular distribution ratio of each and every additive mentioned heretofore.

II. Oil Phase

The terms "organic phase", "oil phase", and "lipophilic phase" are used interchangeably herein.

Prior to commencing polymerization, the oil phase of the microemulsion comprises hydrophobic free-radically (co) polymerizable monomers, free radically (co)polymerizable polar monomer, oil-soluble initiator, and optional reactive lipophilic additives.

II.a. Hydrophobic Free-Radically (Co)Polymerizable Monomers

Hydrophobic free-radically polymerizable, ethylenically-unsaturated monomers useful in the lipophilic phase of the microemulsions of the present invention include but are not limited to those selected from the group consisting of about $C_1$ to about $C_{18}$ alkyl esters of acrylic acid or methacrylic acid, i.e., those esters derived from acrylic acid and about $C_1$ to about $C_{18}$ alcohols. Preferred alkyl (meth)acrylates include those selected from the group consisting of isononyl acrylate, isooctyl acrylate, 2-ethylhexyl acrylate, ethyl acrylate, n-butyl acrylate, decyl acrylate, dodecyl acrylate, isobornyl acrylate, methyl methacrylate, and mixtures thereof. The most preferred alkyl acrylate monomers are those selected from the group consisting of ethyl acrylate, n-butyl acrylate, isooctyl acrylate, isobornyl acrylate, methyl methacrylate, and mixtures thereof.

The organic phase may further optionally comprise free-radically polymerizable ethylenically-unsaturated comonomers which are copolymerizable with the alkyl acrylate monomers described above in order to modify the glass transition temperature ($T_g$) of the resulting polymer composite. Preferred comonomers include those selected from the group consisting of styrene, acrylonitrile, and vinyl esters (such as vinyl acetate, vinyl propionate and vinyl neopentanoate, etc.) with the selection of the comonomer dependent on the properties desired of the final solid bicontinuous polymer.

The bicontinuous microemulsion of the present invention comprises from about 15 to about 85 percent by weight of hydrophobic monomers, preferably from about 25 to about 75 percent by weight, and most preferably from about 30 to about 65 percent by weight based on the total weight of the microemulsion, in order to impart sufficient strength and cohesiveness to the resulting polymer composite prepared therefrom. As has been stated previously, the percent composition of each constituent of the microemulsion will be determined by the skilled practitioner based on the desired properties of the copolymer. The Examples infra and the phase diagrams of FIGS. 1–3 further explain and exemplify how the choice of ratios of constituents is made.

II.b. Free-Radically (Co)Polymerizable Polar Monomer

The organic phase of the microemulsion will contain a portion of the free-radically polymerizable polar monomers described under I.b.ii. and I.b.iii., above, if used, because of the partitioning of such organic materials between the aqueous phase and the organic phase of a microemulsion, as described previously. Each monomer described therein exhibits its own distribution ratio, the enumeration of which is not necessary for the understanding and practicing of the present invention.

II.c. Oil-Soluble Initiators

The oil phase comprises an oil-soluble free-radical photopolymerization initiator ("photoinitiator") and optionally further comprises a thermal initiator.

II.c.i. Oil-Soluble Photoinitiators

Oil-soluble photoinitiators which are useful according to the present invention are those which generate free radicals on exposure to electromagnetic (usually ultraviolet) radiation which act as initiators for the (co)polymerization of the hydrophilic monomer(s) and/or oligomer(s), the oleophilic monomer(s), and, when present, the (co)polymerizable surfactant. Useful photoinitiators include, but are not limited to those selected from the group consisting of: 1) mixtures of Michler's ketone and benzil or benzophenone, preferably in a weight ratio of about 1:4; 2) coumarin-based photoinitiator systems as described in U.S. Pat. No. 4,289,844, incorporated by reference herein; and, preferably, 3) systems based on dimethoxyphenylacetophenone and/or diethoxyacetophenone. The oil-soluble photoinitiators are included in the microemulsions as part of the organic phase, initially. On irradiation, the free-radicals thus generated effect (co) polymerization of monomers in both the aqueous and the organic phases, as well as copolymerization of the (co) polymerizable surfactant.

The organic phase comprises about 0.01 to about 5 parts by weight of an oil soluble photoinitiator, based on 100 parts by weight of total (co)polymerizable species in the microemulsion.

II.c.ii. Optional Oil-Soluble Thermal Initiators

Oil-soluble thermal initiators may optionally be used in the preparation of the bicontinuous polymers of the present invention subsequent to the photopolymerization step as described above in order to complete the polymerization reaction.

Oil-soluble thermal initiators useful in the present invention are initiators which, on exposure to heat, generate free radicals which initiate (co)polymerization of the hydrophilic monomer(s), oligomer(s) the oleophilic monomer(s), and, when present, the polymerizable surfactant, as detailed below. Suitable oil-soluble thermal initiators include but are not limited to those selected from the group consisting of azo compounds such as Vazo 64™ (2,2'-azobis(isobutyronitrile) and Vazo 52™ (2,2'-azobis(2,4-dimethylpentanenitrile)), both available from dupont, peroxides such as benzoyl peroxide and lauroyl peroxide, and mixtures thereof. The preferred oil-soluble thermal initiator is (2,2'-azobis (isobutyronitrile).

The organic phase may comprise about 0 to about 5 parts by weight of an oil-soluble thermal initiator, typically about 0.05 to about 5 parts by weight when used, preferably about 0.1 to about 5 parts if used, based on 100 parts of total weight of (co)polymerizable compounds in the microemulsion.

II.d. Optional Reactive Lipophilic Additives

The organic phase may optionally further comprise one or more additional free-radically reactive constituents, including, but not limited to those selected from the group consisting of oil-soluble crosslinking agents, chain transfer agents, and mixtures thereof. Examples of useful crosslinking agents include but are not limited to those selected from the group consisting of divinylbenzene; about $C_4$ to about $C_8$ alkyl diacrylates such as those selected from the group consisting of 1,4-butanediol diacrylate, 1,6-hexanediol diacrylate, 1,8-octanediol diacrylate; and mixtures thereof. The preferred crosslinking agent is 1,6-hexanediol diacrylate. The crosslinking agent, if added, changes the physical properties, such as cohesive strength, of the final polymer. The organic phase optionally further comprise about 0 to about 75 or more, parts by weight crosslinker, typically, if used, about 0.1 to about 75 percent by weight, based on 100 parts by weight of the total oil phase. The amount of crosslinker used will determine the physical properties of the polymer, such as insolubility in solvents, modulus, and internal strength. For such applications, the organic phase typically comprises about 5 to about 75 parts by weight of a crosslinker, based on 100 parts by weight of the oil phase. One of ordinary skill in the art will be able to determine the proper amount of crosslinker to obtain desired physical properties, and such an artisan will understand that there is no practical upper limit on the amount of crosslinker which can be used in the formulations of the present invention.

The organic phase may optionally further comprise a chain transfer agent. Examples of useful chain transfer agents include but are not limited to those selected from the group consisting of carbon tetrabromide, alcohols, mercaptans, and mixtures thereof. When present, the preferred chain transfer agent is isooctylthioglycolate. The oil phase may further comprise up to about 0.5 parts by weight of a chain transfer agent, typically about 0.01 weight percent to about 0.5 parts by weight, if used, preferably about 0.05 parts by weight to about 0.2 parts by weight, based upon 100 parts by weight of the total oil phase.

II.e. Optional Nonreactive Lipophilic Additives

The oil phase may optionally further comprise one or more nonreactive oil-soluble additives. A variety of nonreactive oil-soluble additives may be included in the microemulsion. These materials are added to produce a final polymer system with specified physical properties or appearance. Examples of such optional oleophilic additives include but are not limited to those selected from the group consisting of plasticizers, such as one of the phthalate esters well-known in the art. The oil phase may optionally further comprise about 0 to about 20 parts by weight of a plasticizer, typically about 5 to about 20 parts by weight if used, preferably about 8 to about 15 weight percent based on 100 parts by weight of the oil phase.

Surfactants

Nonionic and ionic (anionic and cationic) surfactants employed in the present invention to prepare microemulsions are discussed below. The surfactant(s) can be copolymerizable with the monomers present in the microemulsion or non-copolymerizable. The surfactant(s) are preferably copolymerizable so that the resulting polymer composite is less sensitive to water. When resistance to water is not required, non-copolymerizable surfactants are preferred due to their generally lower cost.

1. Nonionic Surfactants

The nonionic surfactants are usually condensation products of an organic aliphatic or alkylaromatic hydrophobic compound and an alkylene oxide, such as ethylene oxide, which is hydrophilic. Almost any hydrophobic compound having a carboxy, hydroxy, amido, or amino group with a free hydrogen present can be condensed with ethylene oxide to form a nonionic surfactant. The length of the ethylene oxide chain of the condensation product can be adjusted to achieve the desired balance between the hydrophobic and hydrophilic elements (Hydrophilic-Lipophilic Balance or HLB). The HLB of a surfactant is an expression of the balance of the size and strength of the hydrophilic (water-loving or polar) and the lipophilic (oil-loving or non-polar) groups of the surfactant. The useful HLB of nonionic surfactants for the present invention to prepare microemulsions is from about 6 to about 19, preferably from about 9 to about 18, and most preferably from about 10 to about 16. Useful nonionic surfactants include those selected from the group consisting of non(co)polymerizable nonionic surfactants, ethylenically-unsaturated copolymerizable nonionic surfactants, and mixtures thereof.

1.a. Non(co)polymerizable Nonionic Surfactants

Particularly suitable nonreactive nonionic surfactants include but are not limited to those selected from the group consisting of the condensation products of a higher aliphatic alcohol, such as a fatty alcohol, containing about 8 to about 20 carbon atoms, in a straight or branched chain configuration, condensed with about 3 to about 100 moles, preferably about 5 to about 40 moles, most preferably about 5 to about 20 moles of ethylene oxide to achieve the above defined HLB. Examples of such nonionic ethoxylated fatty alcohol surfactants are the Tergitol™ 15-S series from Union Carbide and Brij™ surfactants from ICI. Tergitol™ 15-S Surfactants include $C_{11}$–$C_{15}$ secondary alcohol polyethyleneglycol ethers. Brij™ 58 Surfactant is Polyoxyethylene(20) cetyl ether and Brij™ 76 Surfactant is Polyoxyethylene(10) stearyl ether.

Other suitable nonreactive nonionic surfactants include but are not limited to those selected from the group consisting of the polyethylene oxide condensates of one mole of alkyl phenol containing from about 6 to 12 carbon atoms in a straight or branched chain configuration, with about 3 to about 100 moles, preferably about 5 to about 40 moles, most preferably about 5 to about 20 moles of ethylene oxide to achieve the above defined HLB. Examples of nonreactive nonionic surfactants are the Igepal™ CO and CA series from Rhone-Poulenc. Igepal™ CO surfactants include nonylphenoxy poly(ethyleneoxy) ethanols. Igepal™ CA surfactants include octylphenoxy poly(ethyleneoxy) ethanols.

Another group of usable nonreactive nonionic surfactants include but are not limited to those selected from the group consisting of block copolymers of ethylene oxide and propylene oxide or butylene oxide with HLB values of about 6 to about 19, preferably about 9 to about 18, and most preferably about 10 to about 16. Examples of such nonionic block copolymer surfactants are the Pluronic™ and Tetronic™ series of surfactants from BASF. Pluronic™ surfactants include ethylene oxide-propylene oxide block copolymers. Tetronic™ surfactants include ethylene oxide-propylene oxide block copolymers.

Still other satisfactory nonreactive nonionic surfactants include but are not limited to those selected from the group consisting of sorbitan fatty acid esters, polyoxyethylene sorbitan fatty acid esters and polyoxyethylene stearates having HLBs of about 6 to about 19, preferably about 9 to about 18, and most preferably about 10 to about 16. Examples of such fatty acid ester nonionic surfactants are the Span™, Tween™, and Myrj™ surfactants from ICI. Span™ surfactants include $C_{12}$–$C_{18}$ sorbitan monoesters. Tween™ surfactants inlcude poly(ethylene oxide) $C_{12}$–$C_{18}$ sorbitan monoesters.

Myrj™ surfactants include polyethylene oxide stearates.

1.b. Ethylenically-Unsaturated Copolymerizable Nonionic Surfactants

Suitable nonionic surfactants for incorporation in the microemulsions of this invention are ethylenically-unsaturated copolymerizable nonionic surfactants including but not limited to those selected from the group consisting of those falling within the general formula:

$$R-O-(R'O)_m-(EO)_{(n-1)}-CH_2CH_2OH$$

where R is selected from the group consisting of (about $C_2$ to about $C_{18}$) alkenyl, acrylyl, acrylyl (about $C_1$ to about $C_{10}$) alkyl, methacrylyl, methacrylyl (about $C_1$ to about $C_{10}$) alkyl, vinylphenyl and vinylphenylene (about $C_1$ to about $C_6$) alkyl; R'O is selected from the group consisting of bivalent alkyleneoxy groups derived from epoxy compounds having more than two carbon atoms, preferably three or four carbon atoms, such as those selected from the group consisting of propylene oxide, butylene oxide, etc. and combinations thereof; E is a bivalent ethylene radical; m represents an integer of about 5 to about 100; n represents an integer of about 5 to about 100; the ratio of m and n being from about 20:1 to about 1:20. Varying the ratio of m and n will vary the HLB of the polymerizable surfactant. The required HLB for the nonionic surfactant(s) of the present invention is from about 6 to about 19, preferably from about 9 to about 18, and most preferably from about 10 to about 16. Examples of such copolymerizable nonionic surfactants are the alkylene polyalkoxy ethanol surfactants available from PPG Industries under the tradenames Mazon BSN™ 185, 186 and 187. Mazon™ surfactants include alkylene polyalkoxy ethanol.

2. Anionic Surfactants

Anionic surfactants normally include a hydrophobic moiety selected from the group consisting of (about $C_6$ to about $C_{20}$) alkyl, alkylaryl, and alkenyl groups and an anionic group selected from the group consisting of sulfate, sulfonate, phosphate, polyoxyethylene sulfate, polyoxythylene sulfonate, polyoxethylene phosphate and the alkali metal salts, ammonium salts, and tertiary amino salts of such anionic groups. A particular ethylenically-unsaturated copolymerizable surfactant which includes (about $C_2$ to about $C_{18}$) alkenyl polyoxypropylene or (about $C_2$ to about $C_{18}$) polyoxybutylene as a hydrophobic moiety and an anionic group of polyoxyethylene sulfate is also useful in the present invention to prepare microemulsions. Examples of additional anionic surfactants which are useful in the present invention are discussed below.

2. a. Nonreactive Anionic Surfactants

Nonreactive anionic surfactants which can be used in the present invention include but are not limited to those selected from the group consisting of (about $C_6$ to about $C_{20}$) alkyl or alkylaryl sulfates or sulfonates such as sodium lauryl sulfate (commercially available as Polystep™ B-3 from Stepan Co.) and sodium dodecyl benzene sulfonate, (commercially available as Siponate™ DS-10 from Rhone-Poulenc); polyoxyethylene (about $C_6$ to about $C_{20}$) alkyl or alkylphenol ether sulfates with the ethylene oxide repeating unit in the surfactant below about 30 units, preferably below about 20 units, most preferably below about 15 units, such as Polystep™ B-1 commercially available from Stepan Co. and Alipal™ EP110 and 115 from Rhone-Poulenc; (about $C_6$ to about $C_{20}$) alkyl or alkylphenoxy poly(ethyleneoxy)ethyl mono-esters and di-esters of phosphoric acid and its salts, with the ethylene oxide repeating unit in the surfactant below about 30 units, preferably below about 20 units, most preferably below about 15 units, such as Gafac™ PE-510 and Gafac™ RE-610 from GAF.

2.b. Ethylenically-Unsaturated Copolymerizable Anionic Surfactants

Suitable anionic surfactants for incorporation in the microemulsions of this invention include but are not limited to those selected from the group consisting of ethylenically-unsaturated copolymerizable surfactants of the formula:

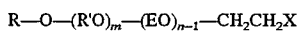

where R is selected from the group consisting of about $C_2$ to about $C_{18}$ alkenyl, acrylyl, acrylyl (about $C_1$ to about $C_{10}$) alkyl, methacrylyl, methacrylyl (about $C_1$ to about $C_{10}$) alkyl, vinylphenyl and vinylphenylene (about $C_1$ to about $C_6$) alkyl; R'O is selected from the group consisting of bivalent alkyleneoxy groups derived from epoxy compounds having more than two carbon atoms, preferably three or four carbon atoms, such as propylene oxide and butylene oxide and mixtures of such alkyleneoxy groups; E is a bivalent ethylene radical; m represents an integer of about 5 to about 100, R represents an integer of about 5 to about 100; the ratio of m and n being from about 20:1 to about 1:20. Varying the ratio of m and n will vary the HLB of the polymerizable surfactant. The required HLB for the anionic copolymerizable surfactants of the present invention, exclusive of the X-group, is from about 3 to about 16. X is an anionic group selected from the group consisting of sulfonate, sulfate, phosphate, and alkali metal salts or ammonium salts or tertiary amino salts of such anionic groups. An example of such a copolymerizable anionic surfactant is Mazon™ SAM 211 from PPG Industries, Inc.

3. Cationic Surfactants

Cationic surfactants useful in the present invention include but are not limited to those selected from the group consisting of quaternary ammonium salts in which at least one higher molecular weight group and two or three lower molecular weight groups are linked to a common nitrogen atom to produce a cation, and wherein the electrically-balancing anion is selected from the group consisting of a halide (bromide, chloride, etc.), acetate, nitrite, and lower alkosulfate (methosulfate etc.). The higher molecular weight substituent(s) on the nitrogen is/are often (a) higher alkyl group(s), containing about 10 to about 20 carbon atoms, and the lower molecular weight substituents may be lower alkyl of about 1 to about 4 carbon atoms, such as methyl or ethyl, which may be substituted, as with hydroxy, in some instances. One or more of the substituents may include an aryl moiety or may be replaced by an aryl, such as benzyl or phenyl. Among the possible lower molecular weight substituents are also lower alkyls of about 1 to about 4 carbon atoms, such as methyl and ethyl, substituted by lower polyalkoxy moieties such as polyoxyethylene moieties, bearing a hydroxyl end group, and falling within the general formula —$R(CH_2CH_2O)_{(n-1)CH_2}CH_2OH$ where —R is $C_{1-4}$ divalent alkyl group bonded to the nitrogen, and n represents an integer of about 1 to about 15. Alternatively, one or two of such lower polyalkoxy moieties having terminal hydroxyls may be directly bonded to the quaternary nitrogen instead of being bonded to it through the previously mentioned lower alkyl. Examples of useful quaternary ammonium halide surfactants for use in the present invention include but are not limited to those selected from the group consisting of methylbis(2-hydroxyethyl)coco-ammonium chloride or oleyl-ammonium chloride, (Ethoquad™ C/12 and O/12, respectively) and methyl polyoxyethylene (15) octadecyl ammonium chloride (Ethoquad™ 18/25) from Akzo Chemical Inc.

In the microemulsions of the present invention, the concentrations of the components are typically as follows, expressed in weight-percent:

TABLE A*

| MICRO-EMULSION | USEFUL | PREFERRED | MOST PREFERRED |
| --- | --- | --- | --- |
| Hydrophobic Monomer | 15–85% | 25–75% | 30–65% |
| Water | 2–40% | 5–50% | 8–40% |
| Polar Species | 2–60% | 5–50% | 8–40% |
| Surfactant | 5–70% | 7–50% | 9–35% |

*The numerical values should be read such that the term "about" is inserted before each numerical value. All percentages are by weight and are based on the total weight of the microemulsion. The concentration of each component is chosen such that the total is 100%.

Process for Making Microemulsion

The method of making the microemulsions of the present invention is relatively straight forward because they tend to form spontaneously with little need for vigorous mixing. However, it is desirable to pre-dissolve the oil-soluble photoinitiator in the hydrophobic monomer(s) and to pre-dissolve under an inert atmosphere any water-soluble additives or an oil insoluble ionic monomer or a water soluble photoinitiator in water to form a solution. Then, the hydrophobic monomer mixture and the water solution are admixed under an inert atmosphere with polar monomer, surfactant, and any other optional additives, to make clear and homogeneous microemulsions without phase separation on aging. It is not necessary to employ heat and most mixings are preferably carried out at about room temperature (20°–30° C.).

Figure 2:
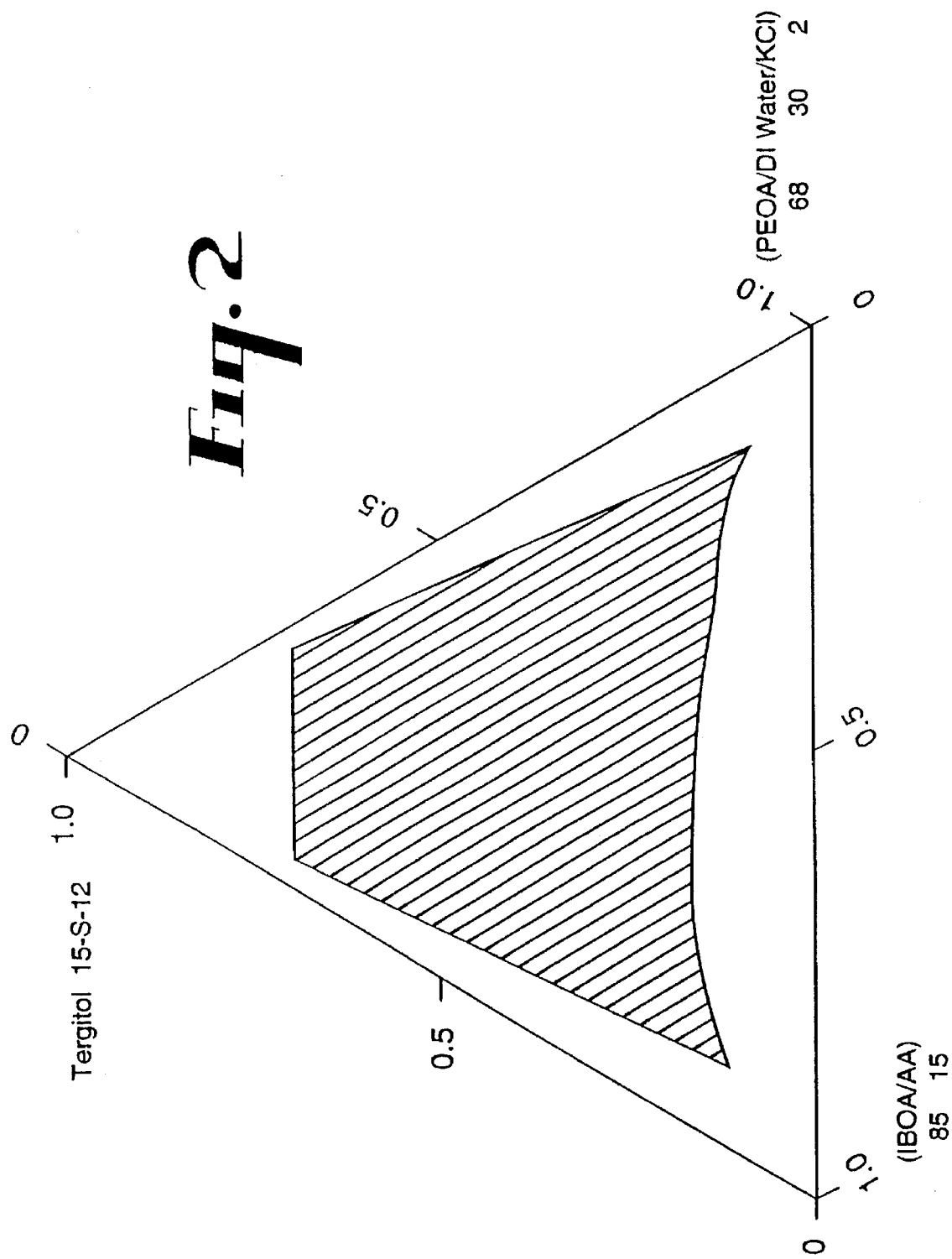
FIG. 2 is a phase diagram, showing both a clear microemulsion area and a turbid emulsion area for preferred compositions of the present invention in which the surfactant is a non-copolymerizable nonionic surfactant.
Figure 3:
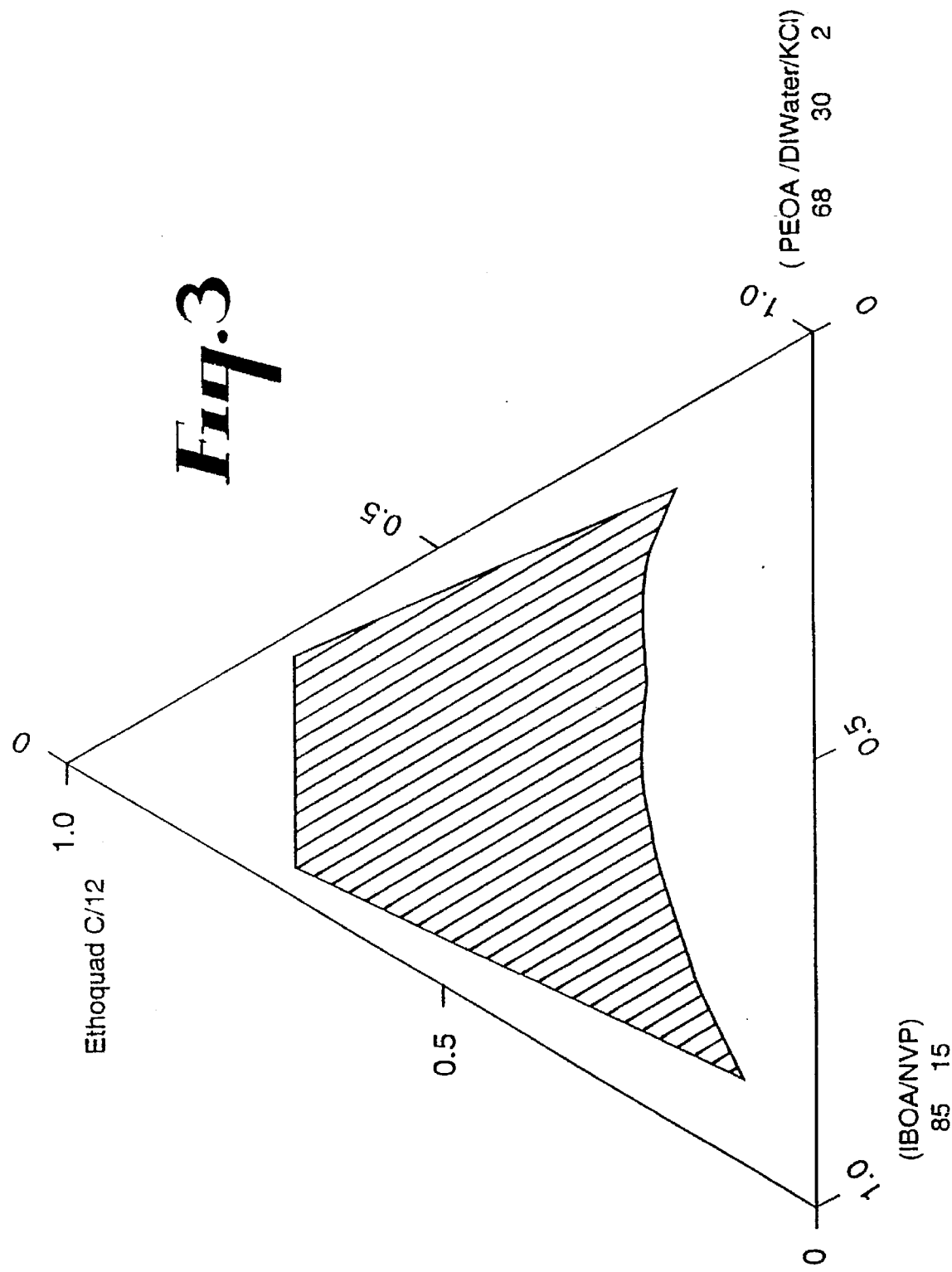
FIG. 3 is a phase diagram, showing both a clear microemulsion area and a turbid emulsion area for preferred compositions of the present invention in which the surfactant is a non-copolymerizable cationic surfactant.

The phase transformation between a one-phase clear microemulsion and a two phase turbid emulsion of the present invention is illustrated in FIGS. 1–3 which show, by way of example only, three-phase diagrams for the concentration of hydrophilic polymerizable phase, hydrophobic polymerizable phase, and surfactant (polymerizable or non-polymerizable) for certain microemulsions.

FIG. 1 is a phase diagram, showing both a clear microemulsion area and a turbid emulsion area for preferred compositions of the present invention, in which the surfactant is a polymerizable anionic surfactant, Mazon™ SAM 211, available from PPG Industries, and the hydrophilic polymerizable phase is a mixture of polyoxyethylene acrylate (PEOA), deionized (DI) water, and potassium chloride, at a weight ratio of 68:30:2, respectively, and the hydrophobic polymerizable phase is a mixture of isobornyl acrylate and acrylic acid at a weight ratio of 85:15, respectively. The shaded area of FIG. 1 indicates the range of concentrations over which useful microemulsions according to the present invention have been obtained.

FIG. 2 is a phase diagram, showing both a clear microemulsion area and a turbid emulsion area for preferred compositions of the present invention, in which the surfactant is a non-polymerizable nonionic surfactant, Tergitol 15-S-12, available from Union Carbide and the hydrophilic polymerizable phase is the mixture of polyoxyethylene acrylate, DI water, and potassium chloride at a weight ratio of 68:30:2, respectively, and the hydrophobic polymerizable phase is a mixture of isobornyl acrylate and acrylic acid at a weight ratio of 85:15, respectively. The shaded area of FIG. 2 indicates the range of concentrations over which useful microemulsions according to the present invention have been obtained.

FIG. 3 is a phase diagram, showing both a clear microemulsion area and a turbid emulsion area for preferred compositions of the present invention, in which the surfactant is a non-polymerizable cationic surfactant, Ethoquad C/12, and the hydrophilic polymerizable phase is a mixture of polyoxyethylene acrylate, DI water, and potassium chloride at a weight ratio of 68:30:2, respectively, and the hydrophobic polymerizable phase is a mixture of isobornyl acrylate and N-vinyl pyrrolidone at a weight ratio of 85:15, respectively. The shaded area of FIG. 3 indicates the range of concentrations over which useful microemulsions according to the present invention have been obtained.

Once the microemulsion is obtained, polymerization occurs via free radical polymerization initiated by irradiation using electromagnetic radiation according to techniques known to those skilled in the art.

The microemulsion is then coated onto a flexible carrier web using any conventional means such as roller coating, dip coating, knife coating, or extrusion coating and subsequently polymerized in an inert atmosphere, i.e., oxygen free, such as using a nitrogen atmosphere as is well known in the art.

The microemulsion can also be polymerized in air by the microemulsion with a plastic film, preferably polyester having a silicone release surface contacting the microemulsion, which is substantially transparent to ultraviolet radiation, but impervious to oxygen, and subsequently irradiating the microemulsion through that film using fluorescent-type ultraviolet lamps which emit UV light in the wavelength range absorbed by the particular photoinitiator used.

Several different lamps which are commercially available may be used. These include medium pressure mercury lamps and low intensity fluorescent lamps, each having various emission spectra and emission maxima between 280 and 400 nm. For convenience, commecially available fluorescent black lights with a maxima at about 351 nm and 90% of the emissions between 300 and 400 nm are preferably utilized.

In general, the total radiation dose should be between about 200–700 milliJoules/cm$^2$. Maximum efficiency and rate of polymerization is dictated by the relationship between emission properties of the radiation source and the absorption properties of the photoactive compounds employed. It is preferable that at least about 75% of the radiation be between 300 and 400 nm in the event that the preferred photoinitiator, 2,2-dimethoxy-2-phenyl-acetophenone, (also known as 2,2-dimethoxy-2-phenyl-1-phenylethanone and benzildimethylketal), is employed.

The photopolymerization can also be carried out in an inert atmosphere; however, tolerance to oxygen can be increased by including an oxidizable tin compound in the composition as disclosed in U.S. Pat. No. 4,303,485.

One photopolymerization process involves initial exposure of the microemulsion to electromagnetic radiation of from about 280 to 500 nm wavelength and from 0.01 to 20 milliWatts/cm$^2$ average light intensity followed by exposure to electromagnetic radiation of from about 280 to 500 nm wavelength and having an average light intensity of greater than 20 milliWatts/cm$^2$.

Preferably, the photopolymerization process involves continuous exposure of the microemulsion to electromagnetic radiation of about 351 nm for enough time to provide about 680 milliJoules/cm$^2$ of the microemulsion. About 10 minutes of photopolymerization time is needed in this circumstance. This amount of ultraviolet energy irradiating the microemulsion can be administered continuously or in batches, according to production requirements.

The polymerization of the microemulsion can occur in ambient conditions. Ambient temperature, pressure, and humidity are acceptable.

Once polymerization is complete, excess water can optionally be removed via evaporation using a convection oven or infrared light sources.

Test Method

Conductivity Measurement

A 4-point probe resistivity measurement was used to measure conductivity of the polymers. Four metal pins at equal distance D (cm) are pressed by springs against the polymer sample. The outer pins carry a current of intensity I (amp). A voltage drop is measured between the inner probes of magnitude V (volt). The resistivity is calculated by the formula:

$$\text{Resistivity } (\Omega\text{cm}) = 2\pi DV/I$$

The conductivity is calculated by the formula:

$$\text{Conductivity} = 1/\text{Resistivity}$$

Reference: L. J. van der Pauw, Philips Res. Repts. 16 (1961) 187; J. Hornstra and L. J. van der Pauw, *J. Electronics and Control* 7 (1959) 169.

Abbreviations and Tradenames

The following abbreviations and tradenames are used herein:

| | |
|---|---|
| Comp. | Comparative |
| DI water | Deionized water |
| IBOA | Isobornyl acrylate |
| IOA | Isooctyl acrylate |
| MMA | Methyl methacrylate |
| AA | Acrylic acid |
| NVP | N-vinyl pyrrolidone |
| AcM | Acrylamide |
| KAA | Potassium acrylate |
| Mazon ™ SAM 211 | Alkylene polyalkoxy sulfate surfactant from PPG Industries, Inc. |
| KCl | Potassium chloride |
| PEOA | Poly(ethylene oxide) acrylate also called poly(oxyethylene) acrylate |
| M.W. | Molecular weight |
| Tergitol 15-S-12 | Ethoxylated fatty alcohol surfactant available from Union Carbide |
| Texapon ™ L100 | Sodium lauryl sulfate surfactant available from Henkel Corp. |
| Siponate ™ DS10 | Sodium dodecyl benzene sulfonate |

| | |
|---|---|
| Gafac ™ RE610 | surfactant available from Rhone-Poulenc Alkyl poly(ethyleneoxy)ethyl phosphate surfactant available from GAF |
| Polystep ™ B-1 | Ammonium alkyl phenol ethoxylate sulfate surfactant available from Stepan Chemical Co. |
| Alipal ™ EP110 | Ammonium alkylphenoxy poly(ethyleneoxy) ethanol sulfate surfactant available from Rhone-Poulenc |

EXAMPLES

The following examples further illustrate but do not limit the present invention. Unless otherwise indicated, all parts, percentages, ratios, etc. in these examples and the rest of the specification are by weight.

Examples 1–6

Examples 1–6 illustrate microemulsions having polymerizable aqueous (hydrophilic) and oil (hydrophobic) phases which were made with polymerizable and non-polymerizable anionic surfactants.

Example 1

A solution of 0.5 gram potassium chloride (KCl) in 7.5 grams of deionized (DI) water was prepared in an 200 milliliter jar at room temperature. To the solution was added 9.4 grams of acrylic acid (AA) and 22.2 grams of poly (ethylene oxide) acrylate (PEOA) to make a hydrophilic phase. The hydrophilic phase was then admixed with 48.0 grams of isobornyl acrylate (IBOA) and 12.5 grams of Mazon™ SAM 211 surfactant to produce a clear microemulsion.

Examples 2–6

The microemulsions of Examples 2–6 were prepared according to the procedure of Example 1, substituting the ingredients and amounts shown in Table B for those of Example 1.

TABLE B

| | Wt. % | | | | | |
|---|---|---|---|---|---|---|
| Example | 1 | 2 | 3 | 4 | 5 | 6 |
| IBOA | 48.0 | 35.5 | 33.4 | 32.9 | 32.5 | 31.8 |
| AA | 9.4 | 6.1 | — | 5.8 | 5.7 | 5.5 |
| NVP | — | — | 16.5 | — | — | — |
| PEOA*** | 22.2 | 27.8 | 22.7 | 26.4 | 26.0 | 24.8 |
| DI Water | 7.4 | 12.2 | 10.0 | 11.6 | 11.4 | 10.9 |
| KCl | 0.5 | — | 0.7 | 0.8 | 0.7 | — |
| Mazon ™ SAM211* | 12.5 | | | | | |
| Texapon ™ L100* | | 18.4 | | | | |
| Siponate ™ DS10* | | | 16.7 | | | |
| Polystep ™ B-1* | | | | 22.5 | | |
| Alipal ™ EP110* | | | | | 23.7 | |
| Gafac ™ RE610* | | | | | | 27.0 |

*All percentages are by weight and are based on the total weight of the microemulsion
**Polystep ™ B-1 and Alipal ™ EP110 anionic surfactants were each dried in a 105° C. oven for about 10 hours to about 15 hours to 100% active prior to use in the microemulsion preparation. Mazon ™ SAM 211, Texapon ™ L100, Siponate ™ DS 10, and Gafac ™ RE610 anionic surfactants were used as received. Mazon ™ SAM 211 is a copolymerizable anionic surfactant. Texapon ™ L100, Siponate ™ DS 10, Polystep ™ B-1, Alipal ™ EP110 and Gafac ™ RE610 are noncopolymerizable anionic surfactants.
***PEOA number average molecular weight = 750

Examples 7–14

Examples 7–14 illustrate the preparation of microemulsions having polymerizable aqueous (hydrophilic) and oil (hydrophobic) phases which were made with copolymerizable and noncopolymerizable nonionic surfactants. The microemulsions were prepared according to the procedure of Example 1 using substituting the components and amounts set forth in Table C below.

TABLE C

| | Weight % | | | | | | | |
|---|---|---|---|---|---|---|---|---|
| Example | 7 | 8 | 9 | 10 | 11 | 12 | 13 | 14 |
| IBOA | 47.1 | 46.1 | 47.4 | 42.6 | 44.8 | 39.4 | 44.1 | 47.4 |
| AA | 9.3 | 9.0 | 9.2 | 8.3 | 8.7 | 7.7 | 8.6 | 9.2 |
| PEOA*** | 23.5 | 22.8 | 23.3 | 21.1 | 22.1 | 19.5 | 21.9 | 23.3 |
| DI Water | 5.8 | 5.7 | 5.8 | 5.3 | 5.5 | 4.9 | 5.5 | 5.8 |
| KCl | 0.5 | 0.5 | — | 0.5 | 0.5 | 0.4 | 0.5 | 0.5 |
| BSN ™ 186* | 13.8 | | | | | | | |
| Igepal ™ CA630* | | 15.9 | | | | | | |
| Tergitol ™ 15-S-12* | | | 14.3 | | | | | |
| Pluronic ™ L64* | | | | 22.2 | | | | |
| Tetronic ™ 1304* | | | | | 18.4 | | | |
| Tween ™ 20* | | | | | | 19.2 | | |
| Myrj ™ 52* | | | | | | | 19.2 | |
| Brij ™ 58* | | | | | | | | 13.8 |

*All percentages are by weight and are based on the total weight of the microemulsion.
**BSN ™ 186 is a copolymerizable nonionic surfactant available from PPG Industries which was used as received (i.e., not dried prior to use). The remaining nonionic surfactants of Table C are noncopolymerizable nonionic surfactants which were also used as received (i.e., not dried prior to use).
***PEOA number average molecular weight = 750

Examples 15 and 16

Examples 15 and 16 illustrate the preparation of microemulsions having polymerizable hydrophilic and hydrophobic phases which were made with noncopolymerizable cationic surfactants. The microemulsions were made according to the procedure of Example 1, substituting N-vinyl pyrrolidone (NVP) for acrylic acid, using the components and amounts set forth in Table D below.

TABLE D

| | Weight %* | |
|---|---|---|
| Example | 15 | 16 |
| IBOA | 31.3 | 35.6 |
| NVP | 8.0 | 7.1 |
| PEOA*** | 14.7 | 31.3 |
| DI Water | 15.3 | 3.6 |
| KCl | — | 0.7 |
| Ethoquad ™ C/12* | 30.7 | |
| Ethoquad ™ 18/25* | | 21.7 |

*All percentages are weight and are based on the total weight of the microemulsion
**The cationic surfactants were used as received (i.e., not dried prior to use).
***PEOA number average molecular weight = 750

Examples 17–25 below describe the preparation of polymer composites with bicontinuous structures by the polymerization of microemulsions.

Process for Making Polymers with Bicontinuous Structures by the Polymerization of Microemulsions

Example 17

A solution of 0.5 gram KCl in 8.8 grams of DI water was prepared in a 200 milliliter jar at room temperature. To the solution was added 9.4 grams AA and 20.8 grams of PEOA to form a hydrophilic phase. The hydrophilic phase was then admixed with 47.7 grams IBOA, 12.5 grams Mazon™ SAM 211 surfactant, and 0.3 gram benzildimethylketal photoinitiator to produce a transparent microemulsion. The transparent microemulsion was then injected into a 5 cm×15 cm×2 millimeter cell which was confined by a pair of glasses with release liners. The cell with the microemulsion was then irradiated by 2 General Electric F40BL 40 watt UV lights, developing 1.9 mJ power at a distance of 6 cm for 20 minutes at room temperature to carry out the polymerization. After polymerization, the polymer solids were electrically conductive as determined by a four-point probe resistivity measurement, indicating a bicontinuous structure of the polymer composite as indicated in Table E.

In Examples 18–24 the ingredients listed in Table E were admixed according to the procedures described above to prepare microemulsions and solid polymers made from the microemulsions. Tacky and nontacky polymers with bicontinuous hydrophilic and hydrophobic polymer composites were prepared in this manner.

Comparative Example 25

Comparative Example 25 was prepared to illustrate preparation of a polymer which is not bicontinuous. The procedure of Example 17 was followed except that DI water was omitted so that no microemulsion was formed. The resulting polymer was essentially non-conducting, as shown in Table E.

The morphology of the polymers produced according to Examples 17 and 24 was observed using a scanning electron microscope SEM (commercially available as an Amray 1810 microscope from Amray, Inc. of Bedford, Mass.). The samples were freeze fractured in liquid nitrogen and sputter coated with gold-pallidium at 10 kV for 4 minutes using a sputtering system (commercially available as an Ultra-Spec 90 LVC Sputtering System from Energy Beam Sciences of Agawam, MA). Magnification was at least 3000 times.

Figure 4:
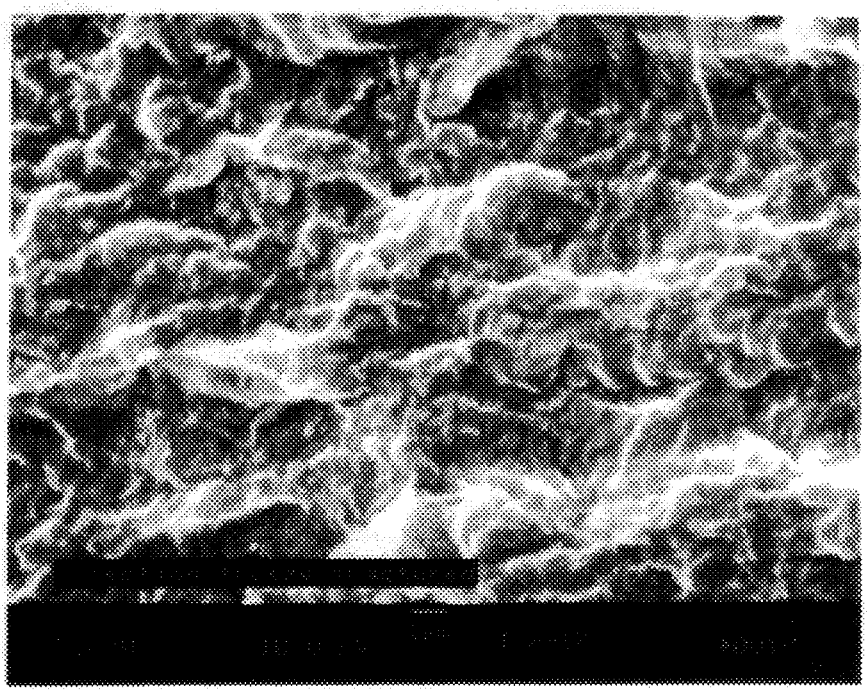
FIG. 4 is a scanning electron photomicrograph of a polymer composite of the present invention prepared according to Example 17 having a substantially nonporous structure.

FIG. 4 shows the SEM micrograph of the polymer of Example 17. The polymer of Example 17 is a flexible, nontacky polymer having a substantially nonporous morphology. Any pores or open spaces of at least 0.1 μm diameter size would be observed. None were found; the polymer was substantially nonporous.

Figure 5:
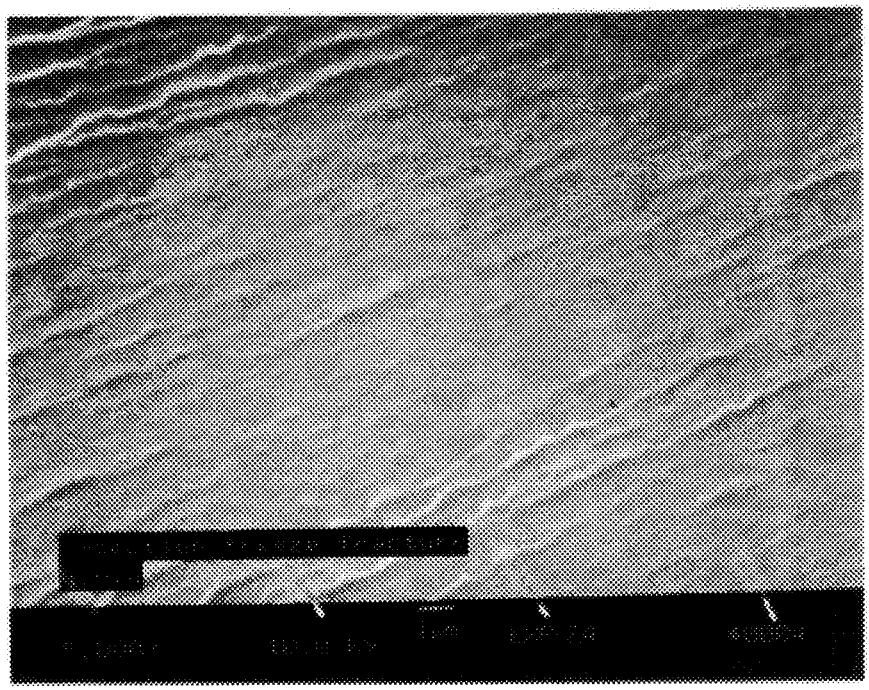
FIG. 5 is another scanning electron photomicrograph of a polymer composite of the present invention prepared according to Example 24 having a substantially nonporous structure.

FIG. 5 shows the SEM micrograph of the polymer of Example 24. The polymer of Example 24 is a nonflexible, nontacky polymer having a substantially nonporous morphology. Any pores or open spaces of at least 0.1 μm diameter size would be observed. None were found; the polymer was substantially nonporous.

By comparison, the polymer of Example 24 was prepared using the thermally induced polymerization using the method disclosed in the Examples of U.S. Pat. No. 5,238,992 (Outubuddin). The polymer composite was a nonflexible, nontacky polymer having large bubbles enclosed therein. The polymer was unacceptably filled with open spaces and was not substantially nonporous.

While this invention has been described in connection with specific embodiments, it should be understood that it is capable of further modification. The claims herein are intended to cover those variations which one skilled in the art would recognize as the chemical equivalent of what has been described here.

What is claimed is:

1. A microemulsion comprising:
   (a) an aqueous phase comprising:
     (i) water;
     (ii) at least one free-radically polymerizable ethylenically-unsaturated polar oligomer;
     (iii) optional water-soluble free-radical photopolymerization initiator;
     (iv) optional water-soluble free-radical thermal polymerization initiator;

TABLE E

| | Weight %* | | | | | | | | |
|---|---|---|---|---|---|---|---|---|---|
| Example | 17 | 18 | 19 | 20 | 21 | 22 | 23 | 24 | Comp. 25 |
| IBOA | 47.7 | 56.1 | | | 22.5 | | 48.3 | 48.8 | 47.7 |
| IOA | | | 50.9 | 46.2 | 22.5 | | | | |
| MMA | | | | | | 45.2 | | | |
| Benzildimethylketal | 0.3 | 0.5 | 0.5 | 0.5 | 0.3 | 0.8 | 0.5 | 0.5 | 0.3 |
| DI Water | 8.8 | 6.0 | 10.0 | 7.7 | 8.5 | 8.5 | 11.3 | 9.5 | |
| KCl | 0.5 | 0.6 | 0.5 | 0.5 | 0.5 | 0.5 | 0.5 | 0.5 | 0.5 |
| PEOA*** | 20.8 | 23.0 | | 22.3 | 20.0 | 20.0 | | | 20.8 |
| AA | 9.4 | | 12.4 | | 9.0 | 9.0 | | 11.5 | 9.4 |
| NVP | | | | 7.8 | | | | | |
| AcM | | | | | | | | 2.5 | |
| KAA | | | | | | | 13.3 | | |
| Mazon SAM™211 | 12.5 | 13.8 | 25.7 | 15.0 | 16.0 | 16.0 | 26.1 | 26.7 | 12.5 |
| *Conductivity × $10^{-7}$ | 22 | 170 | 263 | 197 | 12 | 5 | 10 | 112 | 0.06 |

*All percentages are by weight and are based upon the total weight of the microemulsion
**$\Omega^{-1}$ cm$^{-1}$
***PEOA number average molecular weight = 750

(v) optional water soluble additives;
   (vi) optional nonreactive polar oligomers; and
   (vii) optional cosolvents;
 (b) an organic phase comprising:
   (i) hydrophobic free-radically polymerizable ethylenically-unsaturated monomers,
   (ii) polar (co)polymerizable species, (iii) lipophilic free-radical photopolymerization initiator, (iv) optional lipophilic thermal free-radical polymerization initiator, (v) optional crosslinking agents, (vi) optional chain transfer agents, (vii) optional nonreactive polar oligomers, and (viii) optional oil-soluble additives; and (c) a surfactant.

2. The microemulsion of claim 1 where the surfactant is nonionic and noncopolymerizable.

3. The microemulsion of claim 1 where the surfactant is nonionic and copolymerizable.

4. The microemulsion of claim 1 where the surfactant is anionic and noncopolymerizable.

5. The microemulsion of claim 1 where the surfactant is anionic and copolymerizable with said monomers and oligomer.

6. The microemulsion of claim 1 where the surfactant is cationic and noncopolymerizable.

7. The microemulsion of claim 1 where the surfactant is cationic and copolymerizable with said monomers and oligomer.

8. The microemulsion of claim 1 wherein the microemulsion further comprises about 0.1 to about 1 part by weight of a water-soluble free-radical photopolymerization initiator based on the total weight of the aqueous phase.

9. The microemulsion of claim 1 wherein said water-soluble free-radical photopolymerization initiator is selected from the group consisting of benzophenones substituted with an ionic moiety, a hydrophilic moiety, or both; thioxanthones substituted with an ionic moiety, a hydrophilic moiety, or both; and 4-substituted-(2-hydroxy-2-propyl) phenyl ketones, wherein the 4-substituent is an ionic or hydrophilic moiety.

10. The microemulsion of claim 1 wherein the microemulsion further comprises a water soluble additive selected from the group consisting of water-soluble crosslinkers, pH adjusters, electrolytes, dyes, pigments, pharmaceutically-active compounds, physiologically-active compounds, cosolvents, noncopolymerizable polar oligomers, and mixtures thereof.

11. The microemulsion of claim 1 wherein the microemulsion further comprises a cosolvent selected from the group consisting of aliphatic alcohols having from about 1 to about 8 carbon atoms, polyethers and mixtures thereof.

12. The microemulsion of claim 1 wherein the microemulsion further comprises a nonreactive polar oligomer selected from the group consisting of poly(N-vinylpyrrolidone), polyethylene glycols, poly(ethylenimine), poly(oxyethylene) alcohols, and mixtures thereof.

13. The microemulsion of claim 1 wherein the microemulsion further comprises about 0.1 to about 75 parts by weight of a crosslinking agent based upon the total weight of the oil phase.

14. The microemulsion of claim 1 wherein said crosslinking agent is selected from the group consisting of divinylbenzene; about $C_4$ to about $C_8$ alkyl diacrylates; methylene bisacrylamide; and mixtures thereof.

15. The microemulsion of claim 1 wherein the microemulsion further comprises about 0.01 to about 0.5 parts by weight of a chain transfer agent based upon the total weight of the oil phase.

16. The microemulsion of claim 1 wherein said chain transfer agent is selected from the group consisting of carbon tetrabromide, alcohols, mercaptans, and mixtures thereof.

17. The microemulsion of claim 1 wherein said polar species is selected from the group consisting of polyethylene oxide acrylate, polyethylene oxide diacrylate, polyethylene glycol acrylate, polyethylene glycol diacrylate, N-vinylpyrrolidone macromer, and mixtures thereof.

18. The microemulsion of claim 1 wherein said polar species is selected from the group consisting of polyethylene oxide acrylate, polyethylene dimethyloxide diacrylate, and mixtures thereof.

19. The microemulsion of claim 1 wherein said hydrophobic free-radically polymerizable ethylenically unsaturated monomer is selected from the group consisting of from about $C_1$ to about $C_{18}$ alkyl alcohol esters of acrylic acid and methacrylic acid.

20. The microemulsion of claim 1 wherein said hydrophobic free-radically polymerizable ethylenically unsaturated monomer is selected from the group consisting of decyl acrylate, dodecyl acrylate, isobornyl acrylate, methyl methacrylate, ethyl acrylate, N-butyl acrylate, isooctyl acrylate, 2-ethylhexyl acrylate, and mixtures thereof.

21. The microemulsion of claim 1 said hydrophobic free-radically polymerizable ethylenically unsaturated monomer is selected from the group consisting of isobornyl acrylate, methyl methacrylate, ethyl acrylate, N-butyl acrylate, isooctyl acrylate, and mixtures thereof.

22. A method of preparing a microemulsion, comprising:

(a) preparing a first mixture comprising:
(i) water,
(ii) at least one polar free-radically polymerizable ethylenically-unsaturated oligomer,
(iii) optional free-radical photopolymerization initiator,
(iv) optional thermal free-radical polymerization initiator,
(v) optional water-soluble additives,
(vi) optional cosolvents, and
(vii) optional nonreactive polar oligomers; in an inert atmosphere;

(b) preparing a second mixture comprising:
(i) at least one hydrophobic free-radically polymerizable ethylenically-unsaturated monomer,
(ii) a free-radical photopolymerization initiator,
(iii) optional thermal free-radical polymerization initiator,
(vi) optional crosslinking agent(s),
(v) optional chain transfer agent(s), and
(vi) optional nonreactive polar oligomers;

(c) mixing said first mixture into said second mixture in the presence of a surfactant with mild agitation under an inert atmosphere in order to form a microemulsion.

23. The microemulsion formed according to the method of claim 22.

24. A method of preparing a polymer composite having a substantially nonporous bicontinuous structure, comprising:

(a) preparing a microemulsion as in claim 23; and (b) irradiating the microemulsion in order to form the polymer composite.

25. The method of claim 24 wherein the microemulsion is heated subsequent to said irradiation.

26. The method of claim 24, further comprising treating the polymer composite to remove substantially all residual water.

27. A polymer composite, essentially water-free and having a substantially nonporous bicontinuous structure, formed according to the method of claim 26.

28. A polymer composite having a substantially nonporous bicontinuous structure prepared according to the method of claim 24.

29. A polymer composite film having a substantially nonporous bicontinuous structure prepared according to the method of claim 24.

* * * * *